United States Patent [19]

Kasahara

[11] Patent Number: 5,432,563
[45] Date of Patent: Jul. 11, 1995

[54] IMAGE CONTOUR ENHANCING APPARATUS WHICH LIMITS ENHANCEMENT WHERE SIGNAL COMPONENTS FOR CONTOUR ENHANCEMENT IN BOTH HORIZONTAL AND VERTICAL DIRECTIONS ARE GENERATED IN OVERLAPPING RELATIONSHIP

[75] Inventor: Misa Kasahara, Yokohama, Japan

[73] Assignee: Matsushita Electric Industrial Co., Ltd., Osaka, Japan

[21] Appl. No.: 265,773

[22] Filed: Jun. 27, 1994

[30] Foreign Application Priority Data

Mar. 2, 1994 [JP] Japan .................................. 6-032560

[51] Int. Cl.⁶ .............................................. H04N 5/208
[52] U.S. Cl. ......................................... 348/629; 348/625
[58] Field of Search ............... 348/629, 628, 627, 625, 348/630, 571, 606, 607, 674, 910, 26; 382/54, 55; 358/532, 447

[56] References Cited

U.S. PATENT DOCUMENTS

| | | | |
|---|---|---|---|
| 3,946,152 | 3/1976 | Illetschko et al. | 348/625 |
| 4,086,618 | 4/1978 | Koubek | 348/629 |
| 4,962,419 | 10/1990 | Hibbard et al. | 346/629 |

FOREIGN PATENT DOCUMENTS

| | | | |
|---|---|---|---|
| 3268684 | 11/1991 | Japan | H04N 5/208 |
| 2264419 | 8/1993 | United Kingdom | H04N 9/04 |

*Primary Examiner*—James J. Groody
*Assistant Examiner*—Safet Metjahic
*Attorney, Agent, or Firm*—Stevens, Davis, Miller & Mosher

[57] ABSTRACT

An image contour enhancing apparatus capable of minimizing excessive enhancement of the image contour in an image area where both a horizontal contour enhancing signal and a vertical contour enhancing signal are generated in overlapping relation. In the image contour enhancing apparatus, an image contour enhancing signal produced by deriving a horizontal contour enhancing signal from a video input signal by a high-pass filter, deriving a vertical contour enhancing signal from the video input signal by another high-pass filter and by adding these contour enhancing signals is added by an adder to the video input signal to improve the sharpness of the image contour, and circuits are provided for making variable the signal level of the image contour enhancing signal in the image area where both the horizontal and vertical contour enhancing signals are generated in overlapping relation.

2 Claims, 5 Drawing Sheets

|  |  | ΔH | | |
|---|---|---|---|---|
|  |  | − | 0 | + |
|  | − | 1/2 | 1 | 1 |
| ΔV | 0 | 1 | 1 | 1 |
|  | + | 1 | 1 | 1/2 |

|  |  | ΔH | | |
|---|---|---|---|---|
|  |  | − | 0 | + |
|  | − | NAM | ADDER | ADDER |
| ΔV | 0 | ADDER | ADDER | ADDER |
|  | + | ADDER | ADDER | NAM |

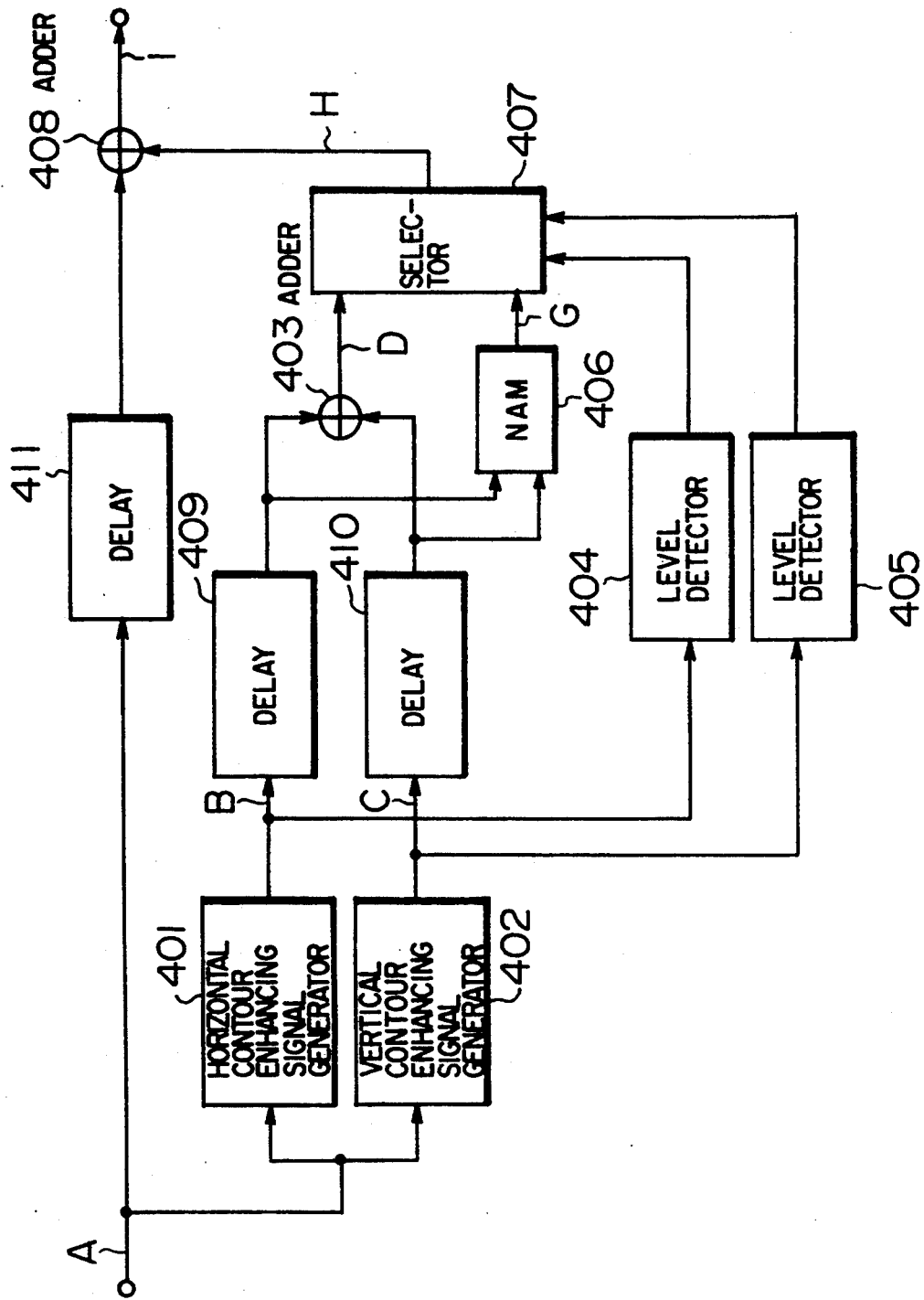

IMAGE CONTOUR ENHANCING APPARATUS WHICH LIMITS ENHANCEMENT WHERE SIGNAL COMPONENTS FOR CONTOUR ENHANCEMENT IN BOTH HORIZONTAL AND VERTICAL DIRECTIONS ARE GENERATED IN OVERLAPPING RELATIONSHIP

BACKGROUND OF THE INVENTION

1. Field of the Invention

This invention relates to an image contour enhancing apparatus for use for signal processing in, for example, a video camera.

2. Description of the Related Art

In an imaging apparatus, such as, a video camera, a horizontal contour enhancing signal component and a vertical contour enhancing signal component are derived from a video input signal, and these signal components are added to the video input signal so as to enhance the image contour thereby enhancing the sharpness of the edge part of the image.

FIG. 7 shows the structure of such a prior art image contour enhancing apparatus. Referring to FIG. 7, in response to a video signal J supplied as an input to the apparatus, a horizontal contour enhancing signal generator circuit 701 generates an output signal for enhancing the contour of the image in the horizontal direction, and a vertical contour enhancing signal generator circuit 702 generates an output signal for enhancing the contour of the image in the vertical direction. The output signal from the horizontal contour enhancing signal generator circuit 701 and that from the vertical contour enhancing signal generator circuit 702 are added in an adder circuit 703. A delay circuit 705 compensates the delay time of the video input signal J supplied to the apparatus. The output signal of the adder circuit 703 and that of the delay circuit 705 are added or composed in another adder circuit 704, and the resultant contour enhanced video signal is outputted from the adder circuit 704.

The operation of the prior art image contour enhancing apparatus will now be described by reference to FIGS. 2 and 8. FIG. 2 schematically shows an image input to the image contour enhancing apparatus. The symbol (J) in FIG. 8 shows the waveform of the video signal J when the image is scanned over periods t0, t1, t2 and t3 in FIG. 2, and the symbols (K), (L), (M) and (N) in FIG. 8 show the signal waveforms appearing from the circuits 701, 702, 703 and 704 respectively in FIG. 7 in response to the supply of the video signal J as the input to the apparatus.

Referring to FIG. 7, in response to the supply of the input signal J to the apparatus, the horizontal contour enhancing signal generator circuit 701 generates the output signal K for enhancing the contour in the horizontal direction, while the vertical contour enhancing signal generator circuit 702 generates the output signal L for enhancing the contour in the vertical direction. The horizontal contour enhancing signal K and the vertical contour enhancing signal L are added or composed in the adder circuit 703 to provide the image contour enhancing signal M, and finally the resultant contour enhanced video signal N appears from the adder circuit 704.

In the prior art apparatus based on the principle described above, high frequency components of a video input signal are extracted and then superposed on the video signal thereby improving the sharpness of the edge part of the image.

However, in the prior art apparatus described above, any especial processing was not made for the image area where both the horizontal and vertical contour enhancing signal components are generated in overlapping relation.

Thus, in the area designated by the numeral 201 in FIG. 2, where the contour enhancing signal components in both the horizontal and vertical directions are generated in the overlapping relation, the value of horizontal contour enhancement ($\Delta H$ in FIG. 8) and the value of vertical contour enhancement ($\Delta V$ in FIG. 8) are directly added to provide the total value of contour enhancement given by $\Delta H + \Delta V$ as indicated by the numeral 801 in FIG. 8. As a result, the prior art apparatus has had such a problem that, when the image contour enhancing signal having the coefficient of contour enhancement given by such a value is added to the video input signal, the contour of the image tends to be excessively enhanced to the extent that the viewer of the reproduced image will feel that he is viewing the reproduced image whose edge part is very unnaturally glaring from the visual aspect.

SUMMARY OF THE INVENTION

With a view to solve the aforementioned problem of the prior art apparatus, it is an object of the present invention to provide a video signal contour enhancing apparatus constructed so as to prevent excessive enhancement of the contour of an image in an area where the signal components for enhancing the contour in both the horizontal and vertical directions are generated in overlapping relation.

According to the present invention which attains the above object, there is provided a video signal contour enhancing apparatus including a horizontal high-pass filter for deriving from a video input signal a signal for enhancing the image contour in the horizontal direction, a vertical high-pass filter for deriving from the video input signal a signal for enhancing the image contour in the vertical direction, means for producing an image contour enhancing signal on the basis of the horizontal and vertical contour enhancing signals, means for adding the image contour enhancing signal to the video input signal to improve the sharpness of the contour of the image, and means for making variable the signal level of the image contour enhancing signal in the image area where both the horizontal and vertical contour enhancing signals are generated in overlapping relation.

Further, according to another aspect of the present invention, there is provided a contour enhancing apparatus of the above character, wherein means are provided for detecting the polarity of each of the horizontal and vertical contour enhancing signals in the image area where both the contour enhancing signals are generated, calculating a coefficient for making variable the amplitude of the image contour enhancing signal when the horizontal and vertical contour enhancing signals have the same polarity, and using the coefficient for making variable the signal level of the image contour enhancing signal.

Further, according to still another aspect of the present invention, there is provided a contour enhancing apparatus of the above character, wherein the horizontal and vertical contour enhancing signals are added to produce the image contour enhancing signal and wherein means are provided for detecting the polarity of each of the horizontal and vertical contour enhancing signals in the image area where the contour enhancing signals are generated, and, when the horizontal and vertical contour enhancing signals have the same polarity, selecting the horizontal contour enhancing signal or the vertical contour enhancing signal having a larger amplitude in the signal level than the other as the image contour enhancing signal.

Therefore, the contour enhancing apparatus of the present invention has the function of detecting the area of the image where both the horizontal and vertical contour enhancing signals are simultaneously generated in overlapping relation and making variable the level of the image contour enhancing signal in the image area where the horizontal and vertical contour enhancing signals are generated in the overlapping relation.

That is, after the polarities of the horizontal and vertical contour enhancing signals generated in the image area in the overlapping relation are detected, a suitable coefficient required for contour compensation is calculated according to the combination of the polarities of these signals, and the image contour enhancing signal corresponding to that image area is suitably processed on the basis of the calculated coefficient for contour compensation.

Also, when the result of the detection of the polarities of the horizontal and vertical contour enhancing signals proves that their polarities are the same, the horizontal or vertical contour enhancing signal having a larger amplitude in the signal level than the other is outputted as the image contour enhancing signal.

BRIEF DESCRIPTION OF THE DRAWINGS

FIG. 4 is a schematic block diagram showing the structure of a second embodiment of the image contour enhancing apparatus according to the present invention.

DESCRIPTION OF THE PREFERRED EMBODIMENTS

A first embodiment of the image contour enhancing apparatus according to the present invention will now be described by reference to FIGS. 1 to 3 and FIG. 6.

Figure 1:
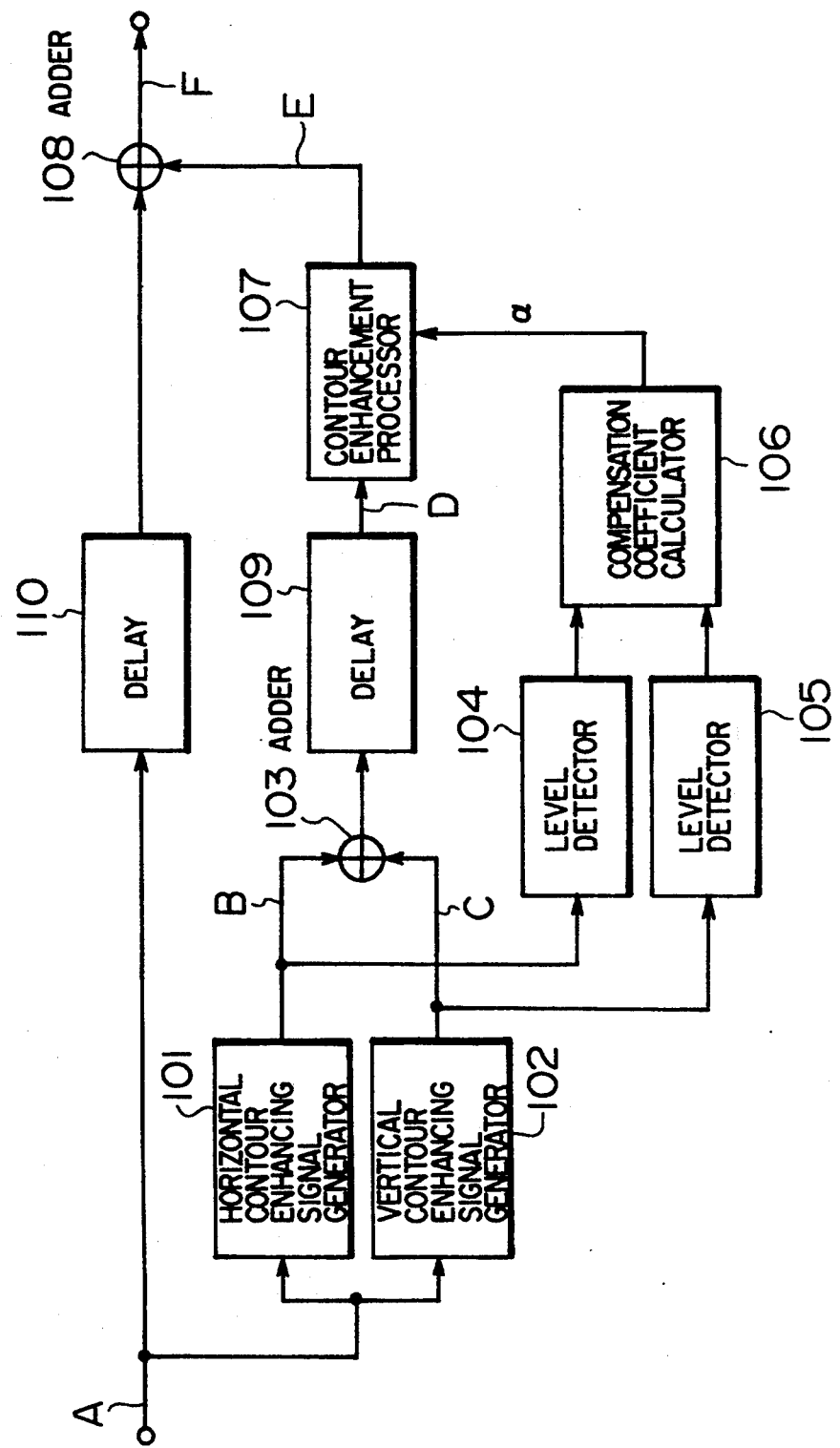
FIG. 1 is a schematic block diagram showing the structure of an embodiment of the image contour enhancing apparatus according to the present invention.

FIG. 1 is a schematic block diagram showing the structure of the first embodiment of the present invention. Referring to FIG. 1, a video input signal A is supplied to a horizontal contour enhancing signal generator circuit 101, a vertical contour enhancing signal generator circuit 102 and a delay circuit 110 in the apparatus. The horizontal contour enhancing signal generator circuit 101, the vertical contour enhancing signal generator circuit 102 and an adder circuit 103 have the same structures as those of the circuits 701, 702 and 703 respectively in the prior art apparatus described already by reference to FIG. 7. Level detector circuits 104 and 105 detect whether the polarity of the horizontal contour enhancing signal generated from the generator circuit 101 and that of the vertical contour enhancing signal generated from the generator circuit 102 are zero or positive or negative. A compensation coefficient calculator circuit 106 calculates a compensation coefficient according to the combination of the polarities of the outputs from the level detector circuits 104 and 105.

In an image contour enhancement processing circuit 107, the output of a delay circuit 109 connected to the adder circuit 103 is multiplied by the compensation coefficient calculated by the compensation coefficient calculator circuit 106. In an adder circuit 108, the output signal of the image contour enhancement processing circuit 107 is added to the output signal of the delay circuit 110 to which the video input signal A is supplied, so that the resultant output signal F of the apparatus appears from the adder circuit 108. The delay circuit 109 acts to compensate the delay time of the video signal A passed through the level detectors 104 and 105 and the compensation coefficient calculator 106. The image contour enhancement processing circuit 107 generates and supplies the image contour enhancing signal E to the adder circuit 108, and this signal E is delayed relative to the video input signal A. The delay circuit 110 acts to match the phase of the signal E with that of the signal A.

Figures 2, 3, 5:
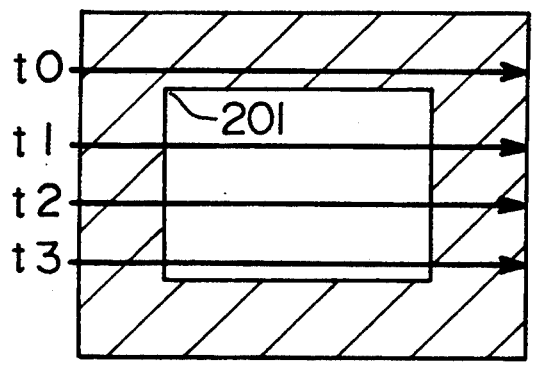
FIG. 2 shows an input image used for illustrating the operation of a prior art apparatus and that of preferred embodiments of the present invention.
FIG. 3 is a table showing the value of a coefficient for contour compensation relative to the combination of the polarities of the horizontal and vertical contour enhancing signals in the first embodiment of the present invention.
FIG. 5 is a table showing the circuits one of which is selected according to the combination of the polarities of the horizontal and vertical contour enhancing signals in the second embodiment shown in FIG. 4.

The operation of the first embodiment will now be described by reference to FIGS. 2, 3 and 6. The symbols (A) to (F) in FIG. 6 designate the waveforms of the signals A to F respectively in the apparatus when the video signal of the image shown in FIG. 2 is supplied as an input to the apparatus shown in FIG. 1. FIG. 3 is a table showing the combination of the polarities of the horizontal and vertical contour enhancing signals detected by and supplied from the level detector circuits 104 and 105 and showing the corresponding value of the output compensation coefficient $\alpha$.

Figure 6:
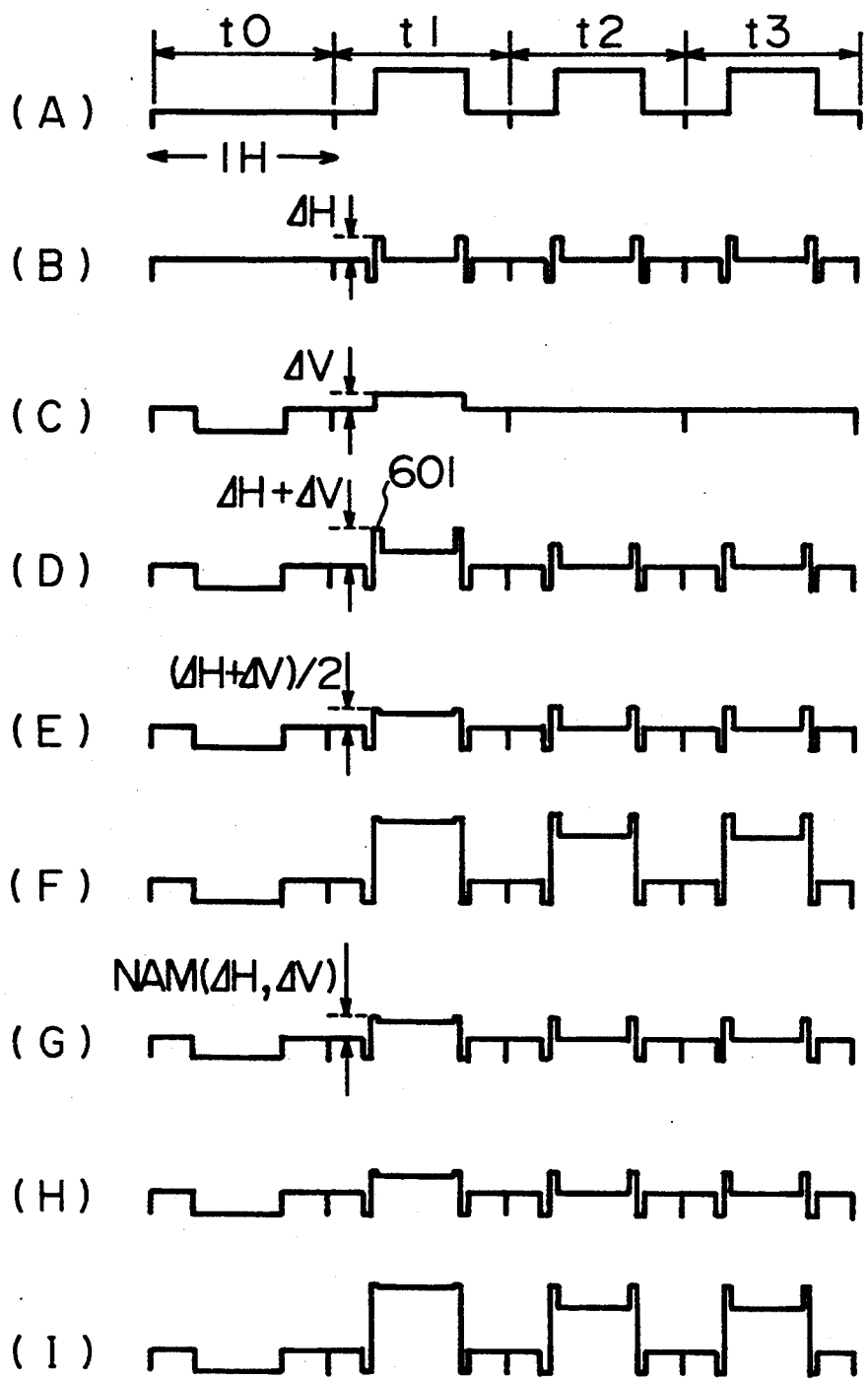
FIG. 6 shows waveforms of various signals appearing in the first and second embodiments shown in FIGS. 1 and 4 respectively.
Figure 7:
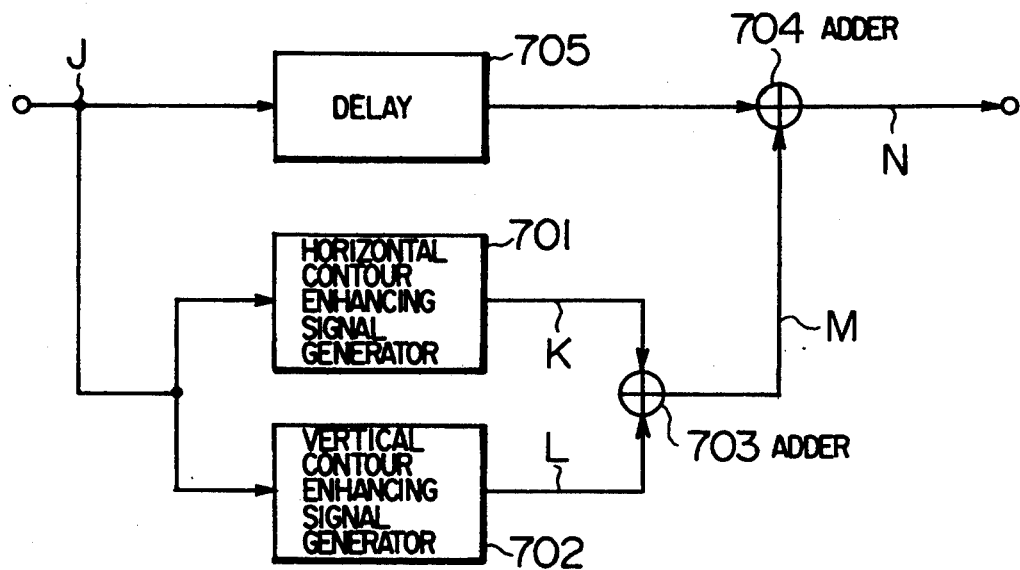
FIG. 7 is a schematic block diagram showing the structure of a prior art image contour enhancing apparatus.
Figure 8:
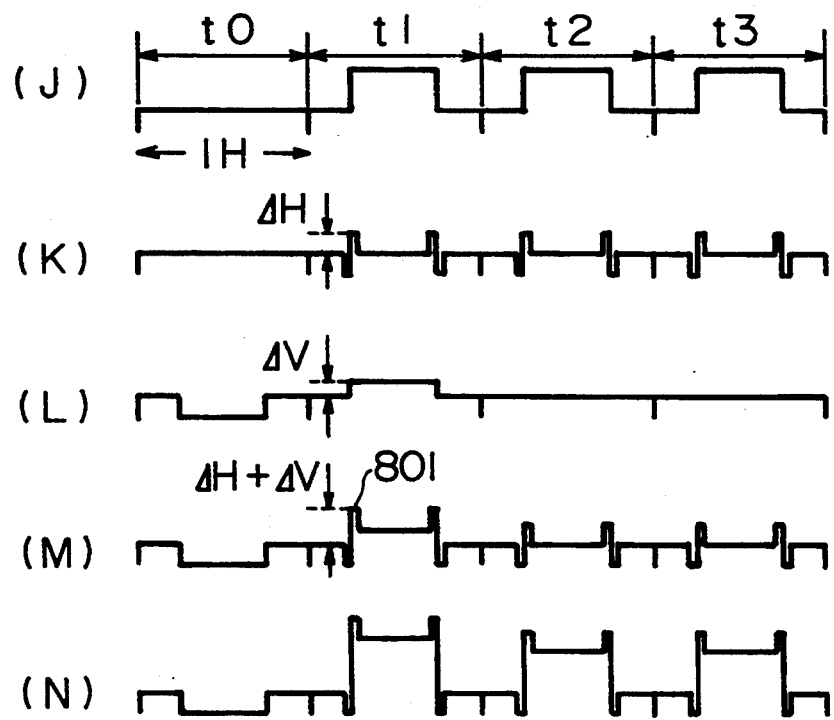
FIG. 8 shows waveforms of various signals appearing in the prior art apparatus shown in FIG. 7.

The operation of the illustrated embodiment of the present invention is similar to that of the prior art apparatus shown in FIG. 7 in the range where the horizontal contour enhancing signal B and the vertical contour enhancing signal C derived from the video input signal A are added or synthesized in the adder circuit 103 to obtain the signal D for enhancing the contour in both the horizontal and vertical directions. In the image area designated by the numeral 201 in FIG. 2, the image contour enhancing signal D having a signal level $\Delta H + \Delta V$ as indicated by the numeral 601 in FIG. 6 is similarly generated.

The level detector circuits 104 and 105 receiving the output signals from the horizontal and vertical contour enhancing signal generator circuits 101 and 102 respectively detect whether the polarity of the horizontal and vertical contour enhancing signals B and C is positive, zero or negative, and their output signals are supplied to the compensation coefficient calculator circuit 106. The compensation coefficient calculator circuit 106 calculates the compensation coefficient according to the combination of the polarities of the horizontal and vertical contour enhancing signals, and the corresponding output signal is supplied to the contour enhancement processing circuit 107.

When the compensation coefficient is set to have values as shown in the table of FIG. 3, the value of the compensation coefficient is ½ at the position designated by the numeral 201 in FIG. 2, that is, in the image area where both the horizontal and vertical contour enhancing signals are generated in overlapping relation as indicated by the numeral 601 in FIG. 6. The value of the compensation coefficient calculated in the compensation coefficient calculator circuit 106 is multiplied in the contour enhancement processing circuit 107 by the signal level, $\Delta H + \Delta V$, of the image contour enhancing signal D, and the compensated image contour enhancing signal E has now the signal level of $(\Delta H + \Delta V)/2$.

In the adder circuit 108, the video input signal A whose phase is matched in the delay circuit 110 with that of the output signal E of the contour enhancement processing circuit 107 is added to or composed with the output signal E of the contour enhancement processing circuit 107 to provide the video signal F where the effect of the horizontal and vertical contour enhancing signals generated in the overlapping relation is compensated.

It will be seen from the above description of the first embodiment of the present invention that, when the horizontal and vertical contour enhancing signals have the same polarity, the compensation coefficient having the value smaller than 1 is calculated to lower the signal level of the image contour enhancing signal. Therefore, the signal level in the image area where both the horizontal and vertical contour enhancing signals generated in overlapping relation can be controlled, so that the possibility of viewing an undesirable unnaturally glaring edge part of the reproduced image in the area where the horizontal and vertical contour enhancing signals overlap each other can be minimized.

A second embodiment of the present invention will now be described by reference to FIG. 2 and FIGS. 4 to 6.

FIG. 4 is a schematic block diagram showing the structure of the second embodiment of the present invention. In FIG. 4, a horizontal contour enhancing signal generator circuit 401, a vertical contour enhancing signal generator circuit 402, an adder circuit 403, level detector circuits 404 and 405, an adder circuit 408 and a delay circuit 411 have the same structures as those of the corresponding circuits 101 to 105, 108 and 110 respectively in the first embodiment shown in FIG. 1. In FIG. 4, an NAM circuit 406 connected through delay circuits 409 and 410 to the horizontal contour enhancing signal generator circuit 401 and the vertical contour enhancing signal generator circuit 402 respectively acts to select one of the generator output signals having a larger amplitude in the signal level than the other, and such an output signal appears from the NAM circuit 406. A selector circuit 407 receives the output signals of the level detector circuits 404 and 405 to select the generator output signal for each picture element according to the combination of the horizontal and vertical contour enhancing signals.

The adder circuit 408 adds the image contour enhancing signal selected by the selector circuit 407 to a video input signal supplied to the apparatus to generate the resultant contour enhanced video signal as its output signal.

The operation of the second embodiment will now be described. The symbols (G) to (I) in FIG. 6 designate the waveforms of the output signal G of the NAM circuit 406, the output signal H of the selector circuit 407 and the output signal I of the adder circuit 408 respectively when the video signal corresponding to the image shown in FIG. 2 and having the waveform A shown in FIG. 6 is inputted to the apparatus. FIG. 5 is a table showing the practical combination of the polarities of the horizontal and vertical contour enhancing signals B and C detected by the level detector circuits 404 and 405 and showing also the circuits to be selected according to the signal polarity combination.

The operation of the second embodiment is similar to that of the prior art apparatus in the range in which, when the video signal A is supplied as an input to the apparatus, the output signals B and C of the horizontal and vertical contour enhancing signal generator circuits 401 and 402 are added to obtain the image contour enhancing signal D. Also, the operation for detecting the signal polarities by the level detectors circuits 404 and 405 is similar to that in the first embodiment. From the output signals B and C of the horizontal and vertical contour enhancing signal generator circuits 401 and 402, the NAM circuit 406 selects one of the output signals having a larger amplitude in the signal level than the other and supplies its output signal G to the selector circuit 407.

On the other hand, the selector circuit 407 receiving the output signals of the level detector circuits 404 and 405 selects the output signal G of the NAM circuit 406 only when the horizontal and vertical contour enhancing signals B and C have the same polarity, as shown in FIG. 5. In any other cases, the selector circuit 407 selects the output signal D of the adder circuit 403. Thus, in the image area 201 shown in FIG. 2 where the horizontal and vertical contour enhancing signals B and C have the same polarity, one of the horizontal and vertical contour enhancing signals having the larger amplitude in the signal level than the other is outputted from the selector circuit 407.

In the adder circuit 408, the output signal of the delay circuit 411 and the output signal H of the selector circuit 407 are added to produce the contour enhanced video signal I.

It will be seen from the above description of the second embodiment of the present invention that the polarities of the horizontal and vertical contour enhancing signals are detected, and only when these signals have the same polarity, one of them having a larger amplitude in the signal level than the other is selected to be the image contour enhancing signal. Therefore, excessive enhancement of the signal level in the image area where both the horizontal and vertical contour enhancing signals are generated in overlapping relation can be suppressed, so that the viewer of the reproduced image can be freed from the sense of viewing a very unnaturally glaring edge part of the image resulting from the overlapping generation of the horizontal and vertical contour enhancing signals.

It will be apparent from the foregoing description of the first embodiment of the present invention that, in order to enhance the contour of an image displayed by a video signal, the polarities of the horizontal and vertical contour enhancing signals derived from the video signal are detected. This first embodiment is advantageous in that, because the degree of image contour enhancement can be controlled in the image area where the horizontal and vertical contour enhancing signals have the same polarity, the possibility of viewing a very unnaturally glaring edge part of the image resulting from the overlapping generation of the horizontal and vertical contour enhancing signals can be minimized.

Further, it will be apparent from the foregoing description of the second embodiment of the present invention that, in the image area where the horizontal and vertical contour enhancing signals generated to have the same polarity, the manner of producing the image contour enhancing signal is suitably modified. Therefore, the second embodiment is similarly advantageous in that the possibility of viewing a very unnaturally glaring edge part of the image resulting from the overlapping generation of the horizontal and vertical contour enhancing signals can be minimized.

I claim:

1. An image contour enhancing apparatus comprising:
   (a) a horizontal high-pass filter for deriving from a video input signal a signal for enhancing the image contour in the horizontal direction;
   (b) a vertical high-pass filter for deriving from the video input signal a signal for enhancing the image contour in the vertical direction;
   (c) means for producing an image contour enhancing signal on the basis of said horizontal and vertical contour enhancing signals;
   (d) means for adding said image contour enhancing signal to said video input signal to improve the sharpness of the contour of the image;
   (e) means for making variable the signal level of said image contour enhancing signal in the image area where both said horizontal and vertical contour enhancing signals are generated in overlapping relation; and
   (f) means for detecting the polarity of each of said horizontal and vertical contour enhancing signals in the image area where both said contour enhancing signals are generated, calculating a coefficient for making variable the amplitude of said image contour enhancing signal when said horizontal and vertical contour enhancing signals have the same polarity, and using said coefficient for making variable the signal level of said image contour enhancing signal.

2. An image contour enhancing apparatus comprising:
   (a) a horizontal high pass filter for deriving from a video input signal a signal for enhancing the image contour in the horizontal direction;
   (b) a vertical high-pass filter for deriving from the video input signal a signal for enhancing the image contour in the vertical direction;
   (c) means for producing an image contour enhancing signal on the basis of said horizontal and vertical contour enhancing signals;
   (d) means for adding said image contour enhancing signal to said video signal to improve the sharpness of the contour of the image;
   (e) means for making variable the signal level of said image contour enhancing signal in the image area where both said horizontal and vertical contour enhancing signals are generated in overlapping relation;
   wherein said means for producing adds said horizontal and vertical contour enhancing signals to produce said image contour enhancing signal; and
   (f) means for detecting the polarity of each of said horizontal and vertical contour enhancing signals in the image area where both said contour enhancing signals are generated, and, when said horizontal and vertical contour enhancing signals have the same polarity, selecting said horizontal contour enhancing signal or said vertical contour enhancing signal having a larger amplitude in the signal level than the other as said image contour enhancing signal.

* * * * *